Dec. 14, 1948. R. A. ACKLEY 2,455,966
VAPOR INDICATING APPARATUS
Filed Oct. 19, 1946
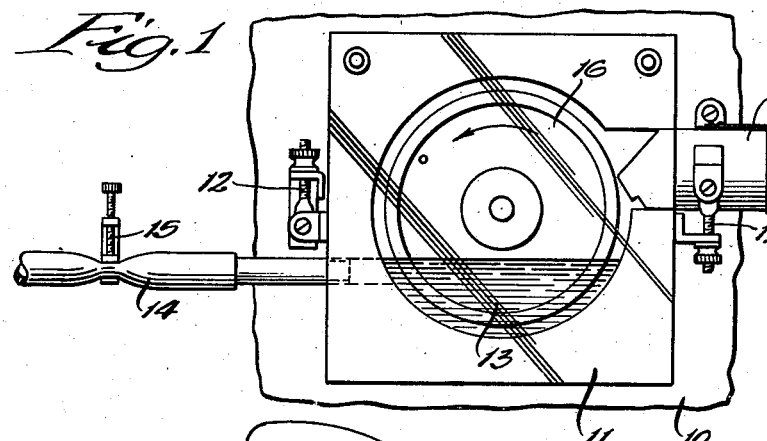
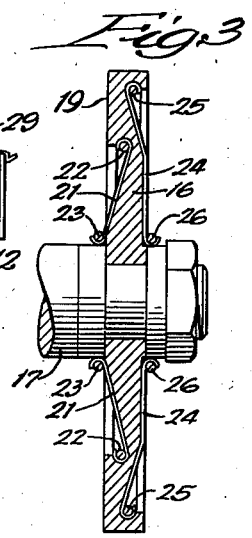
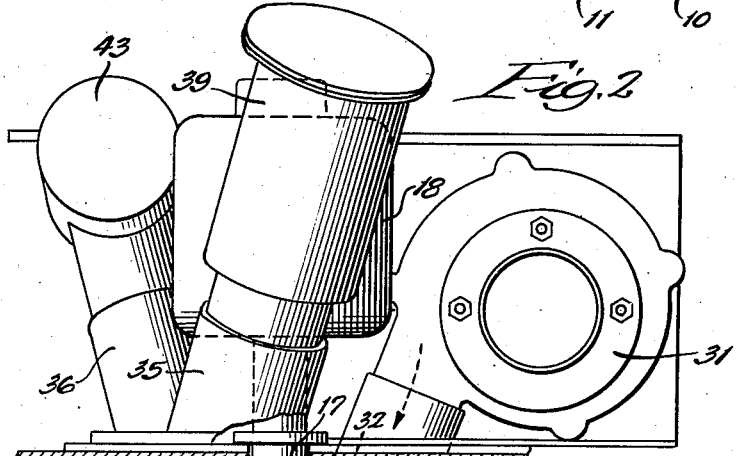
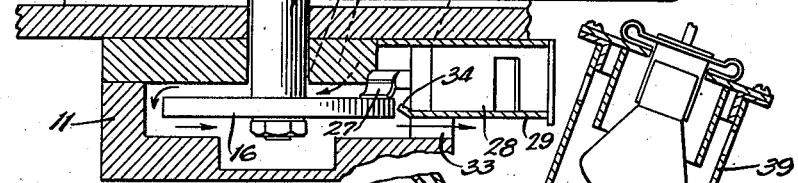
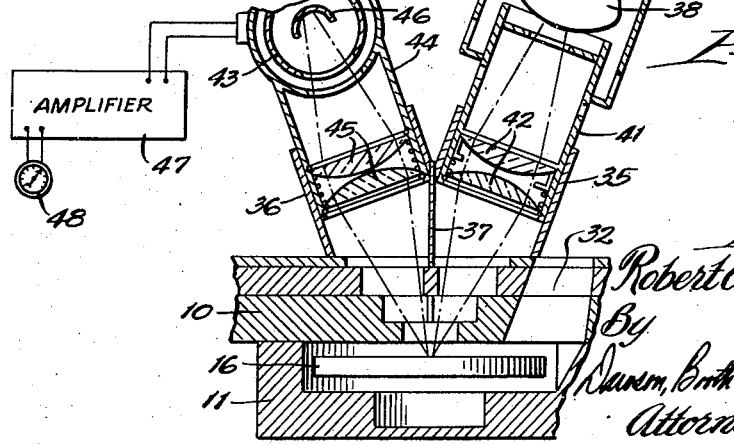
Inventor:
Robert A. Ackley,
By
Dawson, Booth & Spangenberg,
Attorneys.

Patented Dec. 14, 1948

2,455,966

UNITED STATES PATENT OFFICE 2,455,966

VAPOR INDICATING APPARATUS

Robert A. Ackley, Chicago, Ill., assignor to Republic Flow Meters Company, Chicago, Ill., a corporation of Illinois Application October 19, 1946, Serial No. 704,418

8 Claims. (Cl. 73—29)

This invention relates to vapor indicating apparatus and more particularly to apparatus for measuring the quantity of non-aqueous vapor such as medicinal or antiseptic vapor in the air.

The apparatus is particularly useful and is described in connection with the measurement of glycol vapor in air. It has been found that glycol vapor when dispersed in air has the ability to kill many of the germs associated with respiratory diseases and which are apt to induce infection in wounds. If too much vapor is present, it will produce disagreeable fogging in the air, while too little vapor is almost completely ineffective. The present invention has for one of its objects the provision of apparatus for accurately measuring the quantity of glycol vapor or like non-aqueous vapor in air.

Another object is to provide vapor indicating apparatus which is operable continuously to produce a continuous and substantially instantaneous indication of the quantity of vapor in the air.

Still another object is to provide vapor indicating apparatus which is simple and inexpensive to construct and which produces an accurate indication of the vapor content of the air.

The above and other objects and advantages of the invention will be more readily apparent from the following description when read in connection with the accompanying drawing, in which:

Figure 1 is a partial front elevation of a vapor indicating apparatus embodying the invention;

Figure 2 is a partial horizontal section with parts in elevation of the apparatus of Figure 1;

Figure 3 is a section through the disc; and

Figure 4 is a partial section illustrating the mounting of the light source and photo-electric cell.

The apparatus, as shown, comprises a casing made up of a back plate 10 to which a cupped shaped front plate 11 is secured by clamps or the like as indicated at 12. The front plate 11 is hollow, as shown, and is adapted to contain a body of water indicated at 13 which is maintained at a substantially constant level in the casing. Water may be supplied through a hose 14 controlled by a valve 15 and which may, if desired, communicate with a constant level chamber so that the level of water in the casing will be maintained constant during operation.

A disc 16 is rotatably mounted in the casing on a shaft 17 which is in turn driven at a relatively low speed by a motor 18. While no particular speed of the disc is required, I have found that a speed of about three revolutions per hour is satisfactory. As best seen in Figure 3, the disc is formed on one face with a flat portion 19 adjacent its periphery which is highly polished. For this purpose the disc may be made of stainless steel with the flat portion polished or may, if preferred, be plated with chromium or the like to produce a bright, smooth surface. Radially within the polished portion 19 the disc is annularly recessed to receive an annular wick 21. The wick may be held in place by a split ring 22 pressing the wick into the recess and by a similar resilient ring 23 gripping the inner edge of the wick against the hub. In this way the wick may easily be mounted on the disc and will be held in contact with the recessed surface of the disc. A similar wick 24 is secured to the opposite face of the disc and extends at its upper edge into an annular recess adjacent the periphery of the disc. A ring 25 engages the outer edge of the wick 24 to hold it in the recess while a similar ring 26 holds the inner edge of the wick against the hub.

As the disc rotates in the casing, its lower edge including at least portions of the wicks 21 and 22 dip into the body of water 13 so that the wicks will be kept wet and so that the polished surface 19 will be washed. Excess water is removed from the polished surface 19 by a wiper 27 which may be in the form of a flexible rubber blade pressing against the polished surface at the side of the disc where the surface rises from the body of water. The wiper 27 may be carried by a plug 28 inserted in a cylinder 29 which extends through the casing wall at one edge thereof and may be adjustable in the cylinder to maintain the wiper tightly in contact with the polished surface of the disc. With this construction excess water is wiped from the polished disc surface as it rises from the body of water in the casing so that the surface will be clean and relatively dry.

Air is constantly circulated through the casing by a blower 31 mounted adjacent the casing and having its outlet communicate with the casing through an opening 32 in one face thereof above the water level. As best seen in Figure 2, the air enters at one side of the disc toward the edge thereof and is caused to flow around the disc and out a vent opening 33 on the opposite side thereof by a partition 34 in the casing. In this way the air flows completely around the disc to maintain maximum contact therewith and to produce maximum evaporation from the wicks 21 and 24. The air supplied by the blower is drawn from the space in which the vapor concentration is to be tested and may be returned directly to the same space. As the air flows over the disc and evaporates water from the wicks, it will cool the wicks and the disc to the wet bulb temperature of the air. Since this temperature is above the dew point, humidity or water vapor in the air will not condense on the disc, but non-aqueous vapors such as glycol vapor will condense on the polished surface 19.

The amount of condensation of glycol or like vapors on the surface 19 is measured in any desired manner. In the preferred construction, as best seen in Figure 4, the casing back wall 10 is formed with a generally conical opening therethrough above the level of the water in the casing and toward the side of the casing at which the edge of the disc enters the water. A pair of tubes 35 and 36 are secured to the casing in register with the conical opening therein and are separated by a central partition 37 extending partially into the conical opening. The tube 35 carries a light source shown as an electric lamp 38 supported in a housing 39 which is carried by a tube section 41 adjustably slidable into the tube 35. A collecting lens system 42 is mounted in the tube section 41 to collect light beams from the electric lamp and direct the beams toward a point on the polished surface 19 of the disc. The beam reflects into the tube 36 which carries a photo-electric cell 43 mounted on a tube section 44 which is slidable in the tube 36. The tube 44 carries a lens system 45 to direct the reflected beam from the polished disc surface on to an electrode 46 in the tube so that the conductivity of the tube will be varied in accordance with the intensity of the reflected beam. The tube may be connected through an amplifier indicated generally at 47 to a millivoltmeter or the like shown at 48 which may be calibrated in terms of the quantity of vapor in the air. While an indicating meter has been illustrated, it will be understood that the voltages supplied to the meter could be utilized to control the quantity of vapor in the air, if desired.

In operation, as the air is blown through the casing by the blower 31 glycol vapor or other non-aqueous vapors in the air will condense on the polished surface on the disc 19. As vapors condense on the disc, the intensity of reflected light beam will be reduced so that less light will reach the electrode 46 of the photo-electric cell. The amplifier circuit can be so arranged that its output will be reduced in proportion as the light intensity reaching the photo-electric cell is reduced. The meter can, if desired, be calibrated directly in terms of the quantity of vapor in the air so that a direct and continuous indication will be obtained. As the disc turns, vapor condensed thereon will be washed from the polished surface in the body of water, and the polished surface will then be wiped substantially dry by the wiper 27 so that a clean dry surface except for glycol or like condensation thereon is always presented at the point where the light beam is reflected.

While one embodiment of the invention has been shown and described in detail herein, it will be understood that this is illustrative only and is not intended as a definition of the scope of the invention, reference being had for this purpose to the appended claims.

What is claimed is:

1. Vapor indicating apparatus comprising a rotatable disc having a flat polished portion on one face, means to rotate the disc, means to circulate air containing non-aqueous vapor over the disc, means to hold a body of water in contact with the lower portion of the disc whereby circulation of air thereover will cool the disc to a temperature above the dew point of the air, and means to sense the condensation of vapor on the flat polished surface of the disc.

2. Vapor indicating apparatus comprising a rotatable disc having a flat polished portion on one face, means to rotate the disc, means to circulate air containing non-aqueous vapor over the disc, means to hold a body of water in contact with the lower portion of the disc whereby circulation of air thereover will cool the disc to a temperature above the dew point of the air, a light source to direct a beam against the flat polished surface of the disc, and light sensitive means receiving the reflection of the light beam from said surface to indicate the presence of condensed vapor on the surface.

3. Vapor indicating apparatus comprising a disc having a flat polished portion on one face adjacent its periphery, wick means carried by the disc radially within said portion, means to rotate the disc, means to circulate air containing non-aqueous vapor over the disc, a container for water adjacent the disc into which the lower part of the disc and the wick means dip, a wiper to remove excess water from said polished portion of the disc as it leaves the water, and means to sense the condensation of vapor on the wiped polished portion.

4. Vapor indicating apparatus comprising a disc having a flat polished portion on one face adjacent its periphery, wick means carried by the disc radially within said portion, means to rotate the disc, means to circulate air containing non-aqueous vapor over the disc, a container for water adjacent the disc into which the lower part of the disc and the wick means dip, a wiper to remove excess water from said polished portion of the disc as it leaves the water, a light source to direct a beam of light on the wiped polished portion, and light sensitive means receiving the reflection of the beam of light from the polished portion to indicate the presence of condensed vapor on the polished portion.

5. Vapor indicating apparatus comprising a disc having a flat polished portion on one face adjacent its periphery, wick means carried by the disc radially within said portion, means to rotate the disc, means to circulate air containing non-aqueous vapor over the disc, a container for water adjacent the disc into which the lower part of the disc and the wick means dip, a wiper to remove excess water from said polished portion of the disc as it leaves the water, a light source to direct a beam of light on the wiped polished portion, a photoelectric cell receiving the reflected beam of light from the polished surface, and electric indicating means connected to the cell to indicate the presence of condensed vapor on the polished surface.

6. Vapor indicating apparatus comprising a casing adapted to contain a body of water, a disc rotatably mounted in the casing on a horizontal axis so that its lower portion will dip into the water in the casing, the disc having a flat polished surface on one face adjacent its periphery, means to rotate the disc, a wiper in the casing to wipe excess water from the polished surface, means to circulate air containing non-aqueous vapor through the casing over the disc, wick means carried by the disc and dipping into the water in the casing to cool the disc by evaporation, a light source to direct a light beam against the polished surface, and indicating means responsive to reflection of the light beam from the polished surface.

7. Vapor indicating apparatus comprising a casing adapted to contain a body of water, a disc rotatably mounted in the casing on a horizontal axis so that its lower portion will dip into the water in the casing, the disc having a flat polished surface on one face adjacent its periphery, means to rotate the disc, a wiper in the casing to wipe excess water from the polished surface, means to circulate air containing non-aqueous vapor through the casing over the disc, annular wicks carried by the opposite faces of the disc and dipping into the water in the casing to cool the disc in response to evaporation, a light source to direct a light beam against the polished surface, a photo-electric cell receiving the reflected beam from the polished surface, and electric indicating means connected to the cell.

8. Vapor indicating apparatus comprising a casing adapted to contain a body of water, a disc rotatably mounted in the casing on a horizontal axis so that its lower portion will dip into the water in the casing, the disc having a flat polished surface on one face adjacent its periphery, means to rotate the disc, a wiper in the casing to wipe excess water from the polished surface, means to circulate air containing non-aqueous vapor through the casing over the disc, wicks carried by the disc and dipping into the water in the casing to cool the disc by evaporation, the casing having an opening in one side thereof in register with the polished surface of the disc, a pair of tubes carried by the casing over said opening and lying at an angle less than 180° to each other, a light source in one of the tubes to direct a light beam against the polished surface, a photo-electric cell in the other tube to receive the reflected light beam from the polished surface, and indicating means connected to the cell.

ROBERT A. ACKLEY.

REFERENCES CITED

The following references are of record in the file of this patent:

UNITED STATES PATENTS

| Number | Name | Date |
| --- | --- | --- |
| 715,828 | Markmann | Dec. 16, 1902 |
| 1,984,946 | Sauerhoff | Dec. 18, 1934 |
| 2,268,785 | Thornthwaite | Jan. 6, 1942 |
| 2,376,209 | Turin | May 15, 1945 |